Patented June 10, 1924.

1,496,810

UNITED STATES PATENT OFFICE.

DONALD B. KEYES, OF NEW YORK, N. Y., ASSIGNOR TO U. S. INDUSTRIAL ALCOHOL CO., A CORPORATION OF WEST VIRGINIA.

FUEL COMPOSITION.

No Drawing. Application filed December 29, 1921. Serial No. 525,706.

*To all whom it may concern:*

Be it known that I, DONALD B. KEYES, a citizen of the United States, a resident of New York, in the county of New York and State of New York, have invented a certain new and useful Fuel Composition, of which the following is a specification.

This invention relates to a new fuel composition containing unsaturated open chain hydrocarbons.

The invention has as an object the provision of a fuel composition containing a blending agent which has a high calorific value and has sufficient volatility to start an engine without having so high a volatility that it will escape from the composition. A further object is to provide such a composition having a comparatively slow rate of explosion. A still further object is to provide such a composition which can be produced cheaply and can be handled in the liquid state without excessive loss by evaporation. Further objects will appear from the following description.

Although my invention is capable of embodiment in many forms, as a specific embodiment of my invention the following composition may be utilized:—

A fuel is prepared by mixing 50 parts by weight of ethyl alcohol, 40 parts by weight of a light petroleum distillate such as gasoline or kerosene or a mixture of both, and 10 parts by weight of normal butylene ($C_4H_8$). These proportions may vary as, for example, between 30 to 70 parts alcohol, 25 to 50 parts petroleum distillate, and from 5 to 15 parts butylene. The alcohol may have an alcoholic content of 95% or over. This fuel is very effectively blended by virtue of the presence of the butylene, and the boiling point of the latter (—5° C.) is not so low as to render the butylene too volatile and likely to escape, yet it is not so high as to prevent the butylene from acting as a starting agent for the motor. The butylene moreover has good calorific value and can be manufactured at low cost.

In place of the light petroleum distillates in the above composition there may be substituted wholly or in part benzol or its equivalents, and in place of ethyl alcohol may be substituted some of the other alcohols suitable for use in fuels. Among such alcohols may be mentioned methyl alcohol, propyl, butyl and amyl alcohols, but ethyl alcohol is of course preferred. It is preferable to have saturated hydrocarbons present such as gasoline and kerosene, but they may be omitted if desired. When present in fairly small proportions they do not cause any serious variations in the composition of the fuels and serve to impart to the fuel properties which the alcohol alone could not furnish.

While butylene has been mentioned in the preferred embodiment, there are many other unsaturated open chain hydrocarbons which can be used in place thereof. For example the other butylenes may be employed, that is,

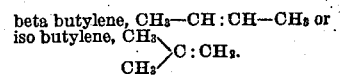

Amylenes may be used such as

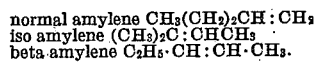

Suitable compounds in the acetylene series may be used, it being desired to utilize compounds whose volatility is neither too high nor too low. In this group may be mentioned for example

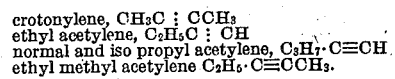

In the above fuel compositions it will be apparent that many variations will be possible, as for example combinations containing the various alcohols and the unsaturated open chain hydrocarbons mentioned and their equivalents. Any unsaturated open chain hydrocarbon suitable for use in an alcoholic fuel may be employed. It is desirable that such compounds have boiling points lying under 50° C. and that they have the properties of decreasing the knock in gasoline engines and also that they will not polymerize or gum up when used in fuels. Many of such compounds will be found to have a single double bond, chemically speaking, as illustrated in the preceding specification. Other fuel ingredients known on the market may of course be added to the above mentioned compositions as desired.

Fuels prepared in this manner will have as a rule a good starting effect, a not too rapid rate of explosion, and will be completely blended. They will have a high calorific value and may yet be manufactured commercially at low cost. It may further be mentioned that fuels which contain only one or two hydrocarbons in considerable proportions give a more uniform explosion curve than in the case of complicated fuel mixtures.

As many apparently widely different embodiments of this invention may be made without departing from the spirit thereof, it is to be understood that I do not intend to limit myself to the specific embodiment thereof except as indicated in the appended claims.

I claim:

1. A liquid fuel composition comprising a lower member of the monohydric alcohol series; a butylene; and a light petroleum distillate.

2. A liquid fuel composition comprising a lower member of the monohydric alcohol series; an unsaturated open chain hydrocarbon having a boiling point below 50° C.; and a light petroleum distillate.

3. A liquid fuel composition comprising about thirty to seventy parts of a lower member of the monohydric alcohol series; about twenty five to fifty parts of a light petroleum distillate; and about five to fifteen parts of a butylene.

4. A liquid fuel composition comprising about 50 parts of ethyl alcohol, about 40 parts of a light petroleum distillate, and about 10 parts of normal butylene.

5. A liquid fuel composition comprising a lower member of the monohydric alcohol series; an unsaturated open chain hydrocarbon having a single double bond; and a light petroleum distillate.

In testimony that I claim the foregoing, I have hereunto set my hand this 5th day of December, 1921.

DONALD B. KEYES.